United States Patent [19]

Herb

[11] Patent Number: 4,757,596
[45] Date of Patent: Jul. 19, 1988

[54] RIVET

[75] Inventor: Eugen Herb, Ditzingen, Fed. Rep. of Germany

[73] Assignee: Trumpf Grusch AG, Grusch, Switzerland

[21] Appl. No.: 944,839

[22] Filed: Dec. 19, 1986

[30] Foreign Application Priority Data

Dec. 21, 1985 [DE] Fed. Rep. of Germany ....... 3545655

[51] Int. Cl.$^4$ .................. B23P 11/00; F16B 19/08
[52] U.S. Cl. .................. 29/524.1; 29/432.2; 227/119; 411/501
[58] Field of Search ............... 29/33 K, 34 B, 522 A, 29/526 A, 707, 432.2, 432.1; 227/119; 411/504, 507, 501, 500, 383, 179

[56] References Cited

U.S. PATENT DOCUMENTS

| 1,394,123 | 10/1921 | Sibley | 411/500 |
| 1,863,314 | 6/1932 | Phelps et al. | 29/707 |
| 2,468,821 | 5/1949 | Goodstein | 227/119 |
| 3,253,631 | 5/1966 | Reusser | 411/179 |
| 3,299,500 | 1/1967 | Double | 29/432.2 |
| 3,314,138 | 4/1967 | Double | 29/432.2 |
| 3,315,345 | 4/1967 | Double et al. | 29/432.1 |
| 3,443,160 | 5/1969 | Salera | 411/504 |
| 3,528,466 | 9/1970 | Tracy | 411/383 X |
| 3,909,913 | 10/1975 | Tildesley | 29/432.2 |
| 4,285,265 | 8/1981 | Rieper | 411/501 |
| 4,596,349 | 6/1986 | Herten | 227/119 |

FOREIGN PATENT DOCUMENTS

| 2013713 | 10/1970 | Fed. Rep. of Germany . |
| 2026040 | 9/1970 | France . |
| 519659 | 2/1972 | Switzerland . |
| 647187 | 1/1985 | Switzerland | 227/139 |
| 1007084 | 10/1965 | United Kingdom . |
| 1173898 | 12/1969 | United Kingdom . |
| 1295291 | 11/1972 | United Kingdom | 411/383 |

Primary Examiner—William R. Briggs

[57] ABSTRACT

A rivet has a head and an elongated shank of generally circular cross section extending axially therefrom. The head has a periphery including a multiplicity of spaced portions projecting radially outwardly of the periphery of the shank and at least three guide portions between these projecting portions which provide guide surfaces extending axially of the rivet with their root surface disposed in substantial axial alignment with the periphery of the shank. The head may have a configuration shaped like a dome, or an inverted frustoconical element, or a prism, and the guide portions can be arcuate in transverse section or rectilinear. The rivet shank may have a groove along its length to facilitate securing of the workpieces therewith without requiring upsetting of the shank, and the shank may have a sharp cutting edge at its free end to facilitate penetration of the workpieces to avoid the necessity for predrilling and the like. A rivet guide member is cooperatively configured to provide axially extending guide elements along a channel therethrough, and these orient the rivet guide surfaces thereagainst with the projecting portions of the rivet head extending into the spaces therebetween.

11 Claims, 2 Drawing Sheets

U.S. Patent   Jul. 19, 1988   Sheet 1 of 2   4,757,596
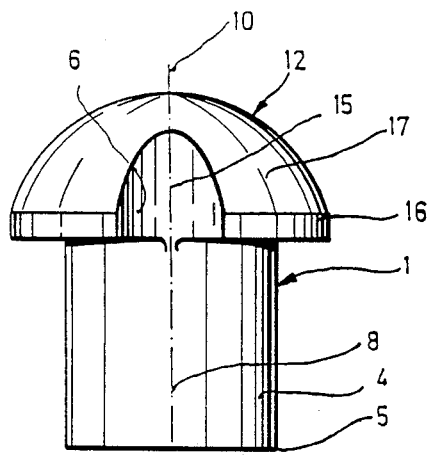
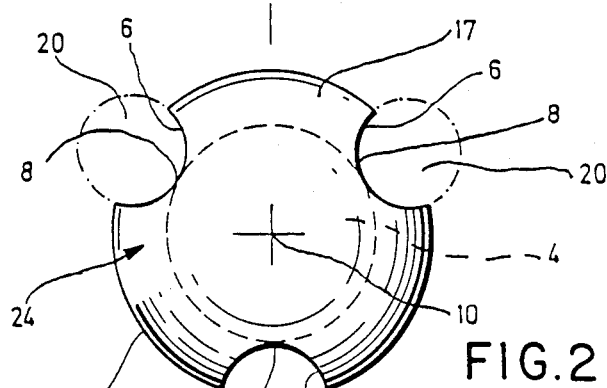
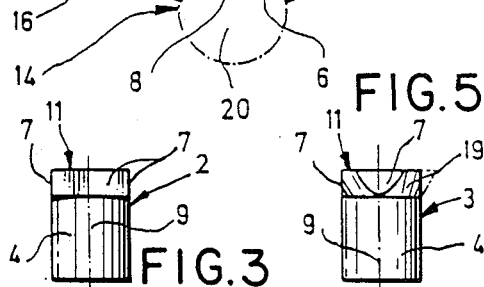
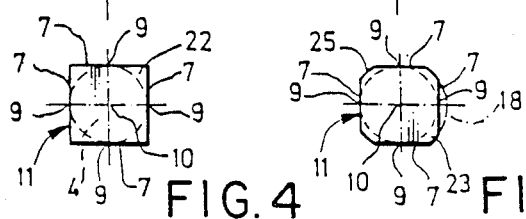
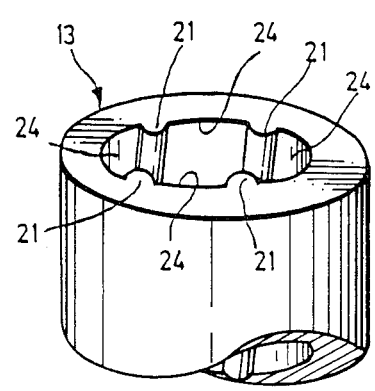

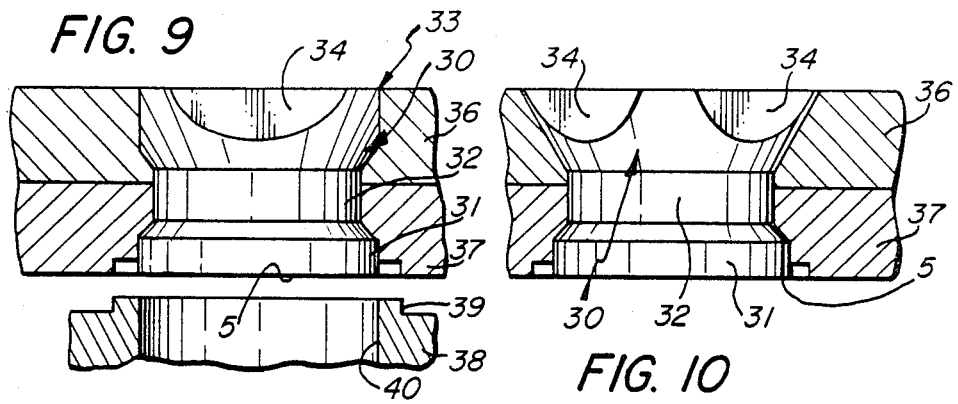
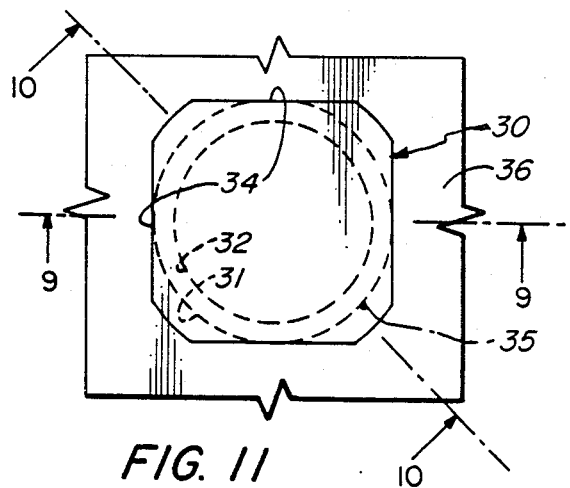
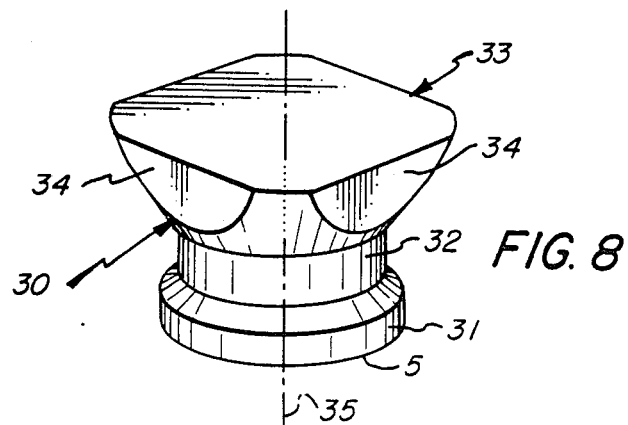

RIVET

BACKGROUND OF THE INVENTION

The invention relates to rivets having cylindrical shanks and a head with portions projecting perpendicularly to its longitudinal axis beyond the periphery of the shank.

Rivets with enlarged heads have been known and commonly used in the art for decades. In many cases, the rivets are placed by hand into aligned holes in the two components or sheets to be riveted to each other, but this insertion is time-consuming and therefore expensive.

Because much use is made of riveting in some areas of manufacturing requiring rapid, repetitive riveting operations, such as aircraft construction, the manual insertion of rivets by hand is not practical. However, automatic delivery and placement of rivets against the workpieces is generally problem-free only if the rivets do not have a radially enlarged head, i.e., bolt-shaped rivets. The rivets are not usable or desirable in some applications, and generally require upsetting of both ends of the rivet.

It is an object of the present invention to provide a rivet with an enlarged head which is adapted to rapid automatic placement in position against the workpieces suitable for an automatic riveting process.

It is also an object to provide such a rivet having a shank which may be utilized to cut through the assembled workpieces to avoid the necessity for predrilling or otherwise forming holes in the workpieces.

Another object is to provide such a rivet which provides means for interlocking the workpieces being assembled by causing metal movement into a recess along its length rather than upsetting of the free end of the shank.

A further object is to provide a feed member cooperating with such rivets to guide and deliver the rivets in proper orientation to the riveting station.

SUMMARY OF THE INVENTION

It has now been found that the foregoing and related objects can be readily attained in a rivet having a head and an elongated shank with a generally circular cross section extending axially therefrom. The head has a peripheral configuration which includes a multiplicity of spaced portions projecting radially outwardly from the periphery of the shank and at least three guide portions between such projecting portions. These guide portions provide guide surfaces extending axially of the rivet with their root or radially smallest surface disposed substantially in axial alignment with the periphery of the shank.

In one embodiment, the projecting portions are defined by a common radius and the guide portions are axially extending, arcuate grooves in the imaginary circular cross section defined by the radius. Preferably, these grooves are equiangularly spaced about the periphery of the head, and the head is of generally dome-shaped configuration with the arcuate grooves equiangularly spaced about its periphery.

In another embodiment, the projecting portions of the head comprise a multiplicity of laterally extending projections and the guide portions are provided by axially extending, generally rectilinear surfaces which extend between the axially extending side margins of adjacent projecting portions and have an axially extending surface portion in axial alignment with the periphery of the shank. The head is of generally inverted frustoconical configuration with a series of axially extending flat surfaces spaced thereabout providing the guide portions.

The cross-section of the head in the plane perpendicular to the axis of the shank may also be polygonal with the edge portions of the polygon defining the projecting portions and the midpoints of the surfaces therebetween being in axial alignment with the periphery of the shank.

In its more desirable form, the free end of the shank has a cutting edge extending thereabout, and at least the shank has a high hardness. The shank may also have a circumferential groove extending thereabout which is spaced inwardly from its free end. The head is of dome-shaped, polygonal or of inverted generally frustoconical configuration tapering to the diameter of the shank. The guide portions are defined by a series of axially extending surfaces thereabout terminating at a point spaced above the groove, and the groove desirably has circumferential surfaces at its upper and lower margins tapering outwardly to the larger diameter of the shank.

The rivet of the present invention is desirably used in a riveting system which has a rivet guide including a feed member providing an elongated channel with a multiplicity of longitudinally extending, inwardly projecting guide surfaces spaced about the channel member. These surfaces are dimensioned and configured cooperatively with respect to the dimensions and spacing of the guide portions of the rivet head and are spaced from each other a distance approximating the spacing between the corresponding guide portions of the rivet. As a result, the rivet is slidable along the channel of the feed member with the guide surfaces closely spaced to the cylindrical shank of the rivet and with the projecting portions of the rivet head disposed in the recesses between the guide surfaces.

BRIEF DESCRIPTION OF THE DRAWINGS

FIG. 1 is a side elevational view of a rivet embodying the present invention;

FIG. 2 is a top view of the rivet of FIG. 1 and showing in phantom line circular guide posts of a rivet feed mechanism disposed in the guide portions of the rivet head;

FIG. 3 is a side elevational view of another rivet embodying the present invention;

FIG. 4 is a top view of the rivet of FIG. 3;

FIG. 5 is a side elevational view of still another rivet embodying the present invention;

FIG. 6 is a top view of the rivet of FIG. 5 with an imaginary circular arc shown in dotted line along one face;

FIG. 7 is a fragmentary perspective view of a feed member of a tubular rivet guide configured to cooperating with the rivets of the present invention shown in FIGS. 3–7;

FIG. 8 is a perspective view of another rivet embodying the present invention;

FIG. 9 is a fragmentary, partially diagrammatic view of a pair of sheets secured together by the rivet of FIG. 8 and of the mandrel used in the riveting operation;

FIG. 10 is a similar view of the assembly at an angle rotated from that of FIG. 9; and FIG. 11 is a fragmentary plan view of the assembly of FIGS. 9 and 10 showing the section lines for the views of FIGS. 9 and 10.

DETAILED DESCRIPTION OF THE ILLUSTRATED EMBODIMENTS

Turning first to the rivet generally designated by the numeral 1 in FIGS. 1 and 2, it has an elongated shank 4 with an axis 10, and a generally dome-shaped head generally designated by the numeral 12. The head 12 has a portion 17 which is a segment of a sphere terminating in a generally cylindrical portion 16. A series of three axially extending grooves 6 of transversely arcuate configuration are provided in the head 12 have their root line or surface 15 axially aligned with the periphery or generatrix 8 of the cylindrical shank 4. At its free end, the shank 4 desirably has a cutting edge 5 to punch through workpieces to be assembled. As seen in FIG. 2, the grooves 6 constitute guide surfaces and the portions 24 extend radially outwardly from the periphery of the shank 4.

In the embodiment of FIGS. 3 and 4, the rivet generally designated by the numeral 2 has a cylindrical shank 4 and a head generally designated by the numeral 11 and which is of polygonal or prismatic configuration. The corner portions 22 of the polygon project radially outwardly from the periphery of the shank 4, and the rectilinear surfaces 7 between the corner portions 22 have their midpoints in axial alignment with the periphery or generatrix 9 of the shank 4.

In the embodiment of FIGS. 5 and 6, the rivet generally designated by the numeral 3 has a shank 4 and a head generally designated by the numeral 11. In this case, the head is of a generally inverted frustoconical configuration 19 as defined in part by the imaginary broken line 18 in FIG. 6. A series of four flats 7 extend axially of the head 11 and provide rectilinear surfaces which have their midpoints located in axial alignment with the periphery or generatrix 9 of the shank 4. The arcuate segments 25 defined by the remainder of the periphery of the head 11 project radially outwardly of the periphery of the shank 4.

Turning now to FIG. 7, a guide member generally designated by the numeral 13 is of generally tubular configuration providing a channel therethrough. A series of axially extending ribs 21 project inwardly of the channel, and the spaces 24 therebetween provide axially surfaces which are of greater radial spacing than the ribs 21.

As a result, when the rivets 2 or 3 are fed through the guide member 13, the flat surfaces 7 are aligned with the periphery or generatrix 9 of the shank 4. The portions 22 or 23 between the flat surfaces 7 extend into the larger diameter spaces between the guide posts 20, and the rivet 2 or 3 is guided in its proper orientation along the guide member to the riveting station (not shown).

In FIG. 2, these guide rods 20 of a feed or guide member are aligned with the grooves 6 in the rivet head 12 to achieve the same guiding function.

Turning now to FIG. 8, the rivet generally designated by the numeral 30 has a shank 31 with a circumferential groove of smaller diameter 32 extending about the shank along its length. The head generally designated by the numeral 33 is of inverted, generally frustoconical configuration with four axially extending flats 34 spaced thereabout, and these flats 34 have their midpoints aligned with the periphery or generatrix 35 of the larger diameter portion of the shank 31. In this embodiment, the head 32 tapers to the small diameter of the groove 33, but it may terminate at the larger diameter of the shank if so desired.

In the riveting process, the rivet 30 is delivered in its axial orientation through a rivet guide 13 or 14 to the upper surface of a pair of overlying sheet metal workpieces 36 and 37 so that the cutting edge 5 is disposed thereagainst. A mandrel 38 with an upstanding collar 39 about a cylindrical passage 40 is brought against the opposite surface of the overlying workpieces 36,37 and a drive member (not shown) and the mandrel 38 apply pressure in opposite directions, the mandrel 38 against the lower workpiece 37 and the drive member against the head 33 of the rivet 30.

As a result, the cutting edge 5 penetrates through the workpieces 36,37 and discharges cylindrical scrap elements (not shown) of the diameter of the shank 31 into the passage 40. As the projecting portions of the head 33 between the flat surfaces 34 are forced into the workpiece 36 and the collar of the mandrel is formed into the workpiece 37, the metal of the workpieces 36,37 is caused to flow into the groove 32 to securely clamp the workpieces 36,37 in assembly.

In each of the several illustrated rivet embodiments which are it can be seen that there is a cylindrical shank, which may have a groove along its length, and a rivet head which has portions projecting radially outwardly beyond the periphery of the shank or of the generatrix defining that periphery. Between these projecting portions are guide portions which have a root or point across their transverse dimension which is in axial alignment with the periphery of the rivet shank. The guide portions provide surfaces which extend axially of the rivet head, and they can be arcuate in the transverse direction as in the form of grooves having their roots lying in the axis of the periphery of the shank, or rectilinear as in the instances of flats in a head of inverted generally frustoconical configuration or the flat side surfaces of a head of prismatic of polygonal cross section.

To achieve the desired alignment of the rivet in cooperating rivet guide and feed elements, there should be at least three such guide surfaces, preferably spaced equiangularly about the axis of the rivet. When polygonal configurations are used for the rivet head, the number of flat surfaces will be equal to the number of sides of the polygon.

As is well known, the rivet heads may be formed by any one of a number of techniques including rivet heading machines, forging and the like. The preferred rivets are formed with the edge at the free end of the shank being sharp to provide a cutting edge. In some instances, it may be desirable to machine the free end to provide a cutting edge with an angle for facile penetration through the workpieces. In all instances where the rivet is to punch the workpiece, it is desirable to form the rivet so that at least its shank is hardened to provide facile penetration though the workpieces during the riveting operation. Generally this will require that the rivet be at least twice the hardness of the metal through which it is to be punched in the instance of aluminum workpieces and at least one and one-half times the hardness for other metal workpieces.

When the rivet has a purely cylindrical shank, it is necessary to effect some deformation of the free end of the shank during the riveting operation in order to clinch or secure the workpieces together. When the rivet is one provided with a circumferential groove as illustrated in FIG. 8, the metal of the workpiece itself may be deformed into the circumferential groove to achieve the interlocking of the rivet and the workpieces. Obviously the head of a rivet of the type illustrated in FIGS. 1 and 2 will normally overlie the surface of the workpiece. The heads of the other embodiments may be driven partly or fully into the workpieces, particular where tapered as in the embodiments of FIGS. 5, 6 and 8.

The feed mechanism which is utilized in combination with the rivets of the present invention, is one in which a channel will be provided through which the rivets are to be passed in the desired axial alignment to the riveting station. The channel may have a series of separate rods providing the guide elements cooperating with the guide surfaces of the rivet as in the schematic illustration of FIG. 2, or it may be a tubular element formed with a series of inwardly projecting axially extending ribs as in the instance of the embodiment shown in FIG. 7. Whatever the case, the rivet shank is maintained in the desired axial orientation by its own elongate length closely fitting between the projecting guide portions of the feed member, and the guide surfaces on the rivet head extend along the cooperating guide ribs or rods; the projecting portions of the head extend outwardly into the wider spacing provided therebetween.

Thus, it can be seen from the foregoing detailed description and the attached drawings that the present invention provides a rivet which with a head to facilitate secure bonding of the workpieces, and which is also adapted to automatic feeding equipment to ensure delivery to the riveting station in desired axial alignment. Moreover, the rivet is one which can be configured to produce interlocking of the workpieces therewith without upsetting the free end of the shank, and it can be configured to function as a self-cutting rivet rather than requiring the preliminary drilling or other forming of holes in the workpieces into which the rivet is to be inserted. The rivet guide means utilized in connection with the rivets of the present invention is simple to fabricate and will ensure rapid, accurate delivery of the rivets in the desired axial alignment to the riveting station.

Having thus described the invention, what is claimed is:

1. A rivet having (i) a head, and (ii) an elongated shank of a generally circular cross section extending axially therefrom, said head having a periphery including a multiplicity of spaced laterally extending portions projecting radially outwardly from the periphery of said shank and a multiplicity of guide portions between the axially extending side margins of adjacent projecting portions and providing generally rectilinear guide surfaces extending axially of said rivet with a point along said guide surfaces being disposed in substantially axial alignment with the periphery of said shank, said guide surfaces including at least one pair of opposed parallel surfaces enabling alignment of a multiplicity of rivets for movement in horizontal direction within an associated feed mechanism.

2. The rivet in accordance with claim 1 wherein said head is of generally inverted frustoconical configuration with a series of axially extending flat surfaces spaced thereabout providing said guide portions.

3. The rivet in accordance with claim 1 wherein the cross-section of said head in the plane perpendicular to the axis of said shank is a polygon with the edge portions of said polygon defining said projecting portions and the midpoints of the guide surfaces therebetween being in axial alignment with said periphery of said shank.

4. The rivet in accordance with claim 1 wherein the free end of said shank has a cutting edge extending thereabout, and at least said shank has a high hardness.

5. The rivet in accordance with claim 1 wherein said shank has a circumferential groove extending thereabout spaced inwardly from its free end.

6. The rivet in accordance with claim 5 wherein said head is of inverted generally frustoconical configuration tapering to the diameter of said shank and said guide portions terminate at a point spaced from said groove.

7. The rivet in accordance with claim 5 wherein said groove has surfaces at its upper and lower margins tapering outwardly to the larger diameter of said shank.

8. A rivet having (i) a head, and (ii) an elongated shank of a generally circular cross section extending axially therefrom, said head having a periphery of generally square cross section providing four equidistantly spaced laterally extending portions projecting radially outwardly from the periphery of said shank and a multiplicity of guide portions between the axially extending side margins of adjacent projecting portions and providing generally rectilinear guide surfaces extending axially of said rivet with the midpoint along said surfaces being disposed in substantially axial alignment with the periphery of said shank, said guide surfaces providing two pairs of opposed parallel surfaces enabling alignment of a multiplicity of rivets for movement in horizontal direction within an associated feed mechanism.

9. The rivet in accordance with claim 8 wherein said head is of generally inverted frustoconical configuration.

10. The rivet in accordance with claim 8 wherein the free end of said shank has a cutting edge extending thereabout, and at least said shank has a high hardness.

11. The rivet in accordance with claim 8 wherein said shank has a circumferential groove extending thereabout spaced inwardly from its free end.

* * * * *

UNITED STATES PATENT AND TRADEMARK OFFICE
CERTIFICATE OF CORRECTION

PATENT NO. : 4,757,596
DATED : July 19, 1988
INVENTOR(S) : Eugen Herb

It is certified that error appears in the above-identified patent and that said Letters Patent is hereby corrected as shown below:

Column 6, line 38, before "surfaces" insert --guide--.

Signed and Sealed this

Sixth Day of December, 1988

*Attest:*

DONALD J. QUIGG

*Attesting Officer*     *Commissioner of Patents and Trademarks*